United States Patent
Bédard et al.

(10) Patent No.: US 9,879,131 B2
(45) Date of Patent: Jan. 30, 2018

(54) RUBBER COMPOSITIONS AND USES THEREOF

(71) Applicant: Soucy Techno Inc., Sherbrooke (CA)

(72) Inventors: François Bédard, Sherbrooke (CA); Denis Dubé, Sherbrooke (CA); Lyle MacDonald, Sherbrooke (CA); Jean-Damien Coué, Sherbrooke (CA)

(73) Assignee: SOUCY TECHNO INC., Sherbrooke (CA)

( * ) Notice: Subject to any disclaimer, the term of this patent is extended or adjusted under 35 U.S.C. 154(b) by 0 days.

(21) Appl. No.: 14/424,474

(22) PCT Filed: Aug. 30, 2013

(86) PCT No.: PCT/CA2013/000754
§ 371 (c)(1),
(2) Date: Feb. 27, 2015

(87) PCT Pub. No.: WO2014/032172
PCT Pub. Date: Mar. 6, 2014

(65) Prior Publication Data
US 2015/0203668 A1    Jul. 23, 2015

Related U.S. Application Data

(60) Provisional application No. 61/695,585, filed on Aug. 31, 2012.

(51) Int. Cl.
| | |
|---|---|
| C08L 7/00 | (2006.01) |
| C08K 3/04 | (2006.01) |
| C08J 5/04 | (2006.01) |
| C08K 3/36 | (2006.01) |
| C08L 23/16 | (2006.01) |
| C08K 7/04 | (2006.01) |
| C08L 9/00 | (2006.01) |
| C08L 9/06 | (2006.01) |
| C08L 77/00 | (2006.01) |
| C08L 77/10 | (2006.01) |

(52) U.S. Cl.
CPC . *C08L 7/00* (2013.01); *C08J 5/04* (2013.01); *C08K 3/04* (2013.01); *C08K 3/041* (2017.05); *C08K 3/36* (2013.01); *C08K 7/04* (2013.01); *C08L 9/00* (2013.01); *C08L 9/06* (2013.01); *C08L 23/16* (2013.01); *C08L 77/00* (2013.01); *C08L 77/10* (2013.01); *C08L 2205/03* (2013.01); *C08L 2205/035* (2013.01); *C08L 2205/16* (2013.01); *C08L 2312/00* (2013.01)

(58) Field of Classification Search
CPC .............. C08K 3/04; C08K 3/36; C08L 77/10
See application file for complete search history.

(56) References Cited

U.S. PATENT DOCUMENTS

| | | | |
|---|---|---|---|
| 4,587,280 A | 5/1986 | Guha et al. | |
| 6,359,045 B1 | 3/2002 | Jeske et al. | |
| 7,244,407 B2 | 7/2007 | Chen et al. | |
| 7,785,669 B2 | 8/2010 | Wang et al. | |
| 8,329,257 B2 | 12/2012 | Larouche et al. | |
| 8,535,570 B2 | 9/2013 | Hermant et al. | |
| 8,920,682 B2 | 12/2014 | Texter | |
| 2004/0173295 A1* | 9/2004 | Zanzig et al. | 152/209.5 |
| 2006/0142455 A1 | 6/2006 | Agarwal et al. | |
| 2007/0255002 A1 | 11/2007 | Alba | |
| 2009/0202764 A1 | 8/2009 | Tonon et al. | |
| 2009/0208708 A1 | 8/2009 | Wei et al. | |
| 2009/0224598 A1 | 9/2009 | St-Amant et al. | |
| 2010/0122642 A1 | 5/2010 | Farrugia et al. | |
| 2010/0124713 A1 | 5/2010 | Farrugia et al. | |
| 2010/0184346 A1 | 7/2010 | Qi et al. | |
| 2010/0234514 A1 | 9/2010 | Noguchi et al. | |
| 2011/0014466 A1 | 1/2011 | Hu et al. | |

(Continued)

FOREIGN PATENT DOCUMENTS

| | | |
|---|---|---|
| CA | 1338446 | 7/1987 |
| CA | 1339435 | 11/1987 |

(Continued)

OTHER PUBLICATIONS

Machine translation of JP 2006-124459 A, published May 18, 2006.*

(Continued)

*Primary Examiner* — Vickey Nerangis
(74) *Attorney, Agent, or Firm* — Bereskin & Parr LLP/S.E.N.C.R.L., s.r.l.

(57) ABSTRACT

There are provided rubber compositions comprising an elastomer comprising a rubber chosen from natural rubber, styrene-butadiene rubber, polybutadiene rubber, nitrile-butadiene rubber, polychloroprene rubber, chlorosulphonated polyethylene rubber, ethylene propylene diene rubber and mixtures thereof; reinforcing fibers chosen from aramid fibers, carbon fibers, polyester fibers, glass fibers, nylon fibers and mixtures thereof, and/or nanometric filamentary structures chosen from nanowires, nanorods, nanofibers, nanoribbons, nanotubes and mixtures thereof, said nanometric filamentary structures being functionalized or unfunctionalized; and a filler chosen from carbon black and silica. These compositions can be cured or uncured and can be effective for preparing various articles such as tracks, pneumatics, strips, sheets, bands, belts, hoses, linings, gaskets, guides, drive lugs, guide lugs, transmission belts etc.

23 Claims, 2 Drawing Sheets

(56) References Cited

U.S. PATENT DOCUMENTS

Figure 1:
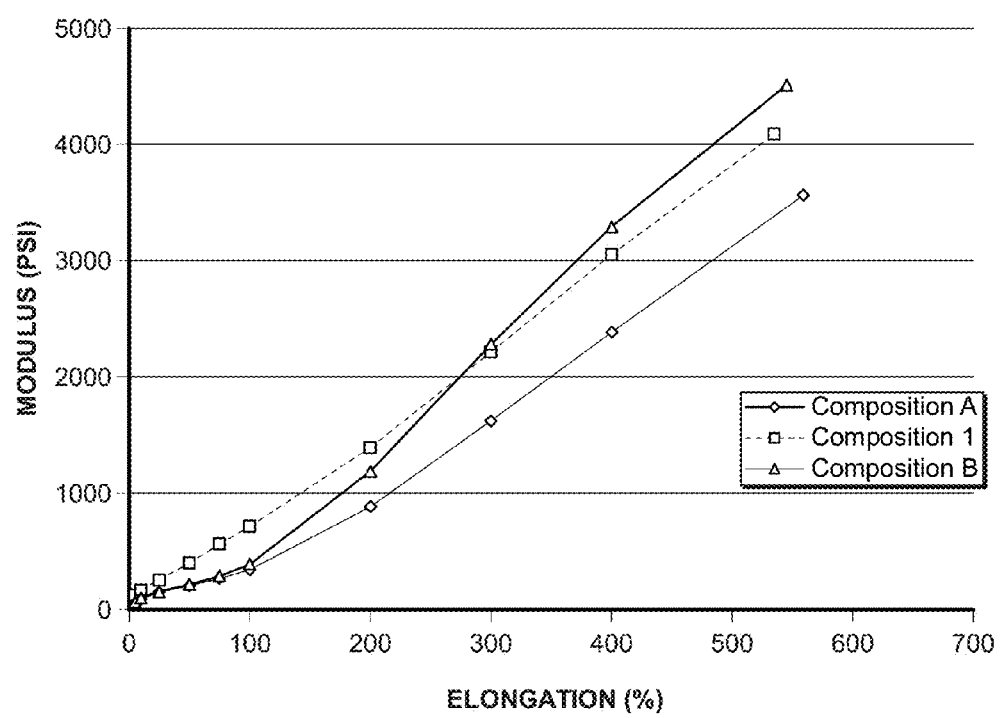

| | | | |
|---|---|---|---|
| 2011/0146859 A1* | 6/2011 | Schmitz et al. | ........... 152/152.1 |
| 2011/0156355 A1 | 6/2011 | Noguchi et al. | |
| 2012/0112133 A1 | 5/2012 | Bahnmüller et al. | |
| 2012/0183770 A1 | 7/2012 | Bosnyak et al. | |
| 2012/0207525 A1 | 8/2012 | Kim et al. | |
| 2013/0261221 A1 | 10/2013 | Bosnyak et al. | |
| 2013/0281612 A1 | 10/2013 | Bosnyak et al. | |

FOREIGN PATENT DOCUMENTS

| | | |
|---|---|---|
| CA | 1337834 | 12/1988 |
| CA | 1338304 | 1/1989 |
| CA | 2081636 | 5/1993 |
| CA | 2122347 | 5/1993 |
| CA | 2084117 | 9/1993 |
| CA | 2094476 | 10/1993 |
| CA | 2110285 | 10/1993 |
| CA | 2097464 | 12/1993 |
| CA | 2101129 | 1/1994 |
| CA | 2100979 | 2/1994 |
| CA | 2106795 | 3/1994 |
| CA | 2088814 | 4/1994 |
| CA | 2088817 | 4/1994 |
| CA | 2109279 | 5/1994 |
| CA | 2109663 | 6/1994 |
| CA | 2110789 | 6/1994 |
| CA | 2111143 | 6/1994 |
| CA | 2111615 | 7/1994 |
| CA | 2113743 | 8/1994 |
| CA | 2105334 | 10/1994 |
| CA | 2160535 | 10/1994 |
| CA | 2104528 | 11/1994 |
| CA | 2163209 | 11/1994 |
| CA | 2104529 | 12/1994 |
| CA | 2104537 | 12/1994 |
| CA | 2166681 | 1/1995 |
| CA | 2108772 | 2/1995 |
| CA | 2108763 | 3/1995 |
| CA | 2118778 | 3/1995 |
| CA | 2171466 | 3/1995 |
| CA | 2144933 | 9/1995 |
| CA | 2145736 | 10/1995 |
| CA | 2145810 | 10/1995 |
| CA | 2125736 | 11/1995 |
| CA | 2129281 | 11/1995 |
| CA | 2189235 | 11/1995 |
| CA | 2143129 | 1/1996 |
| CA | 2144560 | 1/1996 |
| CA | 2195226 | 2/1996 |
| CA | 2134834 | 3/1996 |
| CA | 2138609 | 3/1996 |
| CA | 2138726 | 3/1996 |
| CA | 2207544 | 6/1996 |
| CA | 2154633 | 7/1996 |
| CA | 2166568 | 7/1996 |
| CA | 2154636 | 9/1996 |
| CA | 2154859 | 9/1996 |
| CA | 2160637 | 9/1996 |
| CA | 2171392 | 10/1996 |
| CA | 2171393 | 10/1996 |
| CA | 2173550 | 10/1996 |
| CA | 2158107 | 11/1996 |
| CA | 2221573 | 11/1996 |
| CA | 2158003 | 12/1996 |
| CA | 2160324 | 12/1996 |
| CA | 2160333 | 12/1996 |
| CA | 2157260 | 3/1997 |
| CA | 2184744 | 3/1997 |
| CA | 2184932 | 3/1997 |
| CA | 2194639 | 8/1997 |
| CA | 2180699 | 9/1997 |
| CA | 2180898 | 9/1997 |
| CA | 2181428 | 9/1997 |
| CA | 2203617 | 10/1997 |
| CA | 2253548 | 11/1997 |
| CA | 2207530 | 12/1997 |
| CA | 2201440 | 1/1998 |
| CA | 2209449 | 3/1998 |
| CA | 2206280 | 5/1998 |
| CA | 2228987 | 9/1998 |
| CA | 2230624 | 9/1998 |
| CA | 2234815 | 10/1998 |
| CA | 2236991 | 11/1998 |
| CA | 2241793 | 1/1999 |
| CA | 2244796 | 2/1999 |
| CA | 2245355 | 3/1999 |
| CA | 2245770 | 3/1999 |
| CA | 2246038 | 3/1999 |
| CA | 2257002 | 6/1999 |
| CA | 2310131 | 6/1999 |
| CA | 2260340 | 7/1999 |
| CA | 2260924 | 9/1999 |
| CA | 2272375 | 12/1999 |
| CA | 2318756 | 6/2000 |
| CA | 2296804 | 9/2000 |
| CA | 2297505 | 9/2000 |
| CA | 2301788 | 11/2000 |
| CA | 2309287 | 12/2000 |
| CA | 2312452 | 3/2001 |
| CA | 2314015 | 3/2001 |
| CA | 2314017 | 3/2001 |
| CA | 2316011 | 4/2001 |
| CA | 2338954 | 8/2001 |
| CA | 2368002 | 8/2001 |
| CA | 2408824 | 11/2001 |
| CA | 2352927 | 1/2002 |
| CA | 2353664 | 1/2002 |
| CA | 2417681 | 2/2002 |
| CA | 2442965 | 4/2002 |
| CA | 2443249 | 4/2002 |
| CA | 2369237 | 7/2002 |
| CA | 2364723 | 8/2002 |
| CA | 2364781 | 8/2002 |
| CA | 2441330 | 10/2002 |
| CA | 2385205 | 11/2002 |
| CA | 2423187 | 11/2002 |
| CA | 2394454 | 3/2003 |
| CA | 2459377 | 3/2003 |
| CA | 2423498 | 9/2003 |
| CA | 2509699 | 7/2004 |
| CA | 2515895 | 8/2004 |
| CA | 2469106 | 11/2004 |
| CA | 2469693 | 12/2004 |
| CA | 2530471 | 2/2005 |
| CA | 2544592 | 5/2005 |
| CA | 2491190 | 8/2005 |
| CA | 2591942 | 7/2006 |
| CA | 2593476 | 7/2006 |
| CA | 2620452 | 2/2007 |
| CA | 2620682 | 3/2007 |
| CA | 2658970 | 12/2007 |
| CA | 2674053 | 7/2008 |
| CA | 2679037 | 8/2008 |
| CA | 2645610 | 5/2009 |
| CA | 2670145 | 12/2009 |
| CA | 2746026 | 7/2010 |
| CA | 2770878 | 3/2011 |
| CA | 2784412 | 6/2011 |
| CA | 2784438 | 6/2011 |
| CA | 2821074 | 6/2012 |
| CN | 100344441 C | 10/2007 |
| CN | 101735492 A | 6/2010 |
| CN | 102585349 A | 7/2012 |
| EP | 2138535 | 12/2011 |
| GB | 2484338 | 4/2012 |
| JP | 2006124459 A * | 5/2006 |
| WO | 03060002 | 7/2003 |
| WO | 2004097853 | 11/2004 |
| WO | 2005037710 | 4/2005 |
| WO | 2014032172 | 3/2014 |

(56) References Cited

FOREIGN PATENT DOCUMENTS

| WO | 2015054779 | 4/2015 |
|---|---|---|
| WO | 2015089647 | 6/2015 |

OTHER PUBLICATIONS

Botros et al., "Effect of Fiber Reinforcement on Thermal Stability and Swelling Behavior of CR/NBR Blends", Polym.-Plast. Technol. Eng., 39(2), 393-414 (2000).
Cataldo et al., "A Comparative Study on the Reinforcing Effect of Aramide and PET Short Fibers in a Natural Rubber-Based Composite", Journal of Macromolecular Science, Part B: Physics, 48:1241-1251, 2009.
Mathew et al., "Hybrid Composite Based on Nanosilica, Nylon 6 Short Fibre, and Styrene Butadiene Rubber—a Study on the Effect of Fillers and Bonding Agent", Progress in Rubber, Plastics and Recycling Technology, vol. 26, No. 1, 2010.
O'Connor, "Short-Fiber-Reinforced Elastomer Composites", Rubber Chemistry and Technology, vol. 50(5), 945-958, 1977.
Bokobza et al., "Blends of Carbon Blacks and Multiwall Carbon Nanotubes as Reinforcing Fillers for Hydrocarbon Rubbers", Journal of Polymer Science Part B: Polymer Physics, vol. 46(18) 1939-1951, 2008.
Praveen et al., "Effects of nanoclay on the mechanical and damping properties of aramid short fibre-filled styrene butadiene rubber composites", Polymer International, vol. 59(2), 187-197, 2010.
Abstract Sui et al., "Preparation and Properties of Natural Rubber Composites Reinforced with Pretreated Carbon Nanotubes", Published on Mar. 16, 2008.
Abstract Yue et al., "Study on Preparation and Properties of Carbon Nanotubes/Rubber Composites", Published on Apr. 2006.
Bokobza et al., "Blends of Carbon and Multiwall Carbon Nanotubes as Reinforcing Fillers for Hydrocarbon Rubbers", Journal of Polymer Science: Part B: Polymer Physics, vol. 46, 1939-1951 (2008).
Claims of CA2193183, "Vulcanisable Rubber Compositions for the Production of Vehicle Tyres", Published on Jun. 21, 1997.
Davey, "Development of Carbon Nanotube/Carbon Fiber Multiscale Reinforcement Composites", A Thesis submitted to the Department of Industrial Engineering in partial fulfillment of the Requirements for the degree of Master of Science, Fall Semester, 2005.
Ahmad et al., "Reinforced Thermoplastic Natural Rubber (TPNR) Composites with Different Types of Carbon Nanotubes (MWNTS)", Published online on Jul. 20, 2011.
Koning et al., "Polymer Carbon Nanotube Composites—The Polymer Latex Concepts", Published on Apr. 30, 2012.
Mathew et al, "Hybrid Composite Based on Nanosilica, Nylon 6 Short Fibre, and Styrene Butadiene Rubber—a Study on the Effect of Fillers and Bonding Agent", Progress in Rubber, Plastics and Recycling Technology, vol. 26, No. 1, 2010.
O'Connor, "Short-Fiber-Reinforced Elastomer Composites", Rubber Chemistry and Technology, Nov. 1977, vol. 50, No. 5, pp. 945-958.
Praveen et al., "Effect of nanoclay on the mechanical and damping properties of aramid short fibre-filled styrene butadiene rubber composites", Published online in Wiley Interscience: Oct. 19, 2009.
Praveen et al., "Synergistic effect of carbon black and nanoclay fillers in styrene butadiene rubber matrix: Development of dual structure", Composites: Part A 40 (2009) 309-316.
Sui et al., "Preparation and properties of natural rubber composites reinforced with pretreated carbon nanotubes", Polym. Adv. Technol. (2008).
Michael Graham Richard/Tree Hugger, "Rubber Tracks Make Military Vehicles More Efficient, Durable, and Quieter", Published on Dec. 15, 2008.
English Translation of CN101735492A, "Engineering Tire Tread Rubber", Published on Jun. 16, 2010.
English Translation of CN101602867B, "Modified Chloroprene Rubber V Band and Method for Preparing Same", Published on Apr. 13, 2011.
English Abstract of CN101381483(A), "Method for preparing carbon nanotube-natural rubber compound material", Published on Mar. 11, 2009.
English Abstract of CN101831090(A), "High-performance natural rubber vulcanized rubber of carbon-containing nanotube, and preparation method thereof", Published on Sep. 15, 2010.
English Abstract of CN102321279(A), "Dopamine modified carbon nanotube/rubber material and preparation method thereof", Published on Jan. 18, 2012.
English abstract of CN102516608(A), "One high wear-resisting outstanding dynamic property nano rare earth inorganic substance/rubber compound materials", Published on Jun. 27, 2012.
English Abstract of JP2006083249(A), "Method for producing dispersed solution of rubber composition mixed with nano carbon", Published on Mar. 30, 2006.
English Abstract of JP2009046547(A), "Rubber Composition for Tire", Published on Mar. 5, 2009.
English Abstract of JP2010058740(A), "Pneumatic Tire", Published on Mar. 18, 2010.
English Abstract of JP2012126853(A), "Rubber Particulate Highly Blended Carbon Nanotubes, and Method for Producing the Same", Published on Jul. 5, 2012.
English Abstract of KR100635603(B1), "Bladder Rubbert Composition with High Heat Conductivity for Curing Tire", Published on Oct. 11, 2006.
English Abstract of KR100635604(B1), "Tire Tread Rubber Composition for Improving Wear Resistance Property", Published on Oct. 18, 2006.
English Abstract of KR100705784(B1), "Rubber Composition for Tire Apex that Comprises Base Rubber, Carbon Nanotubes and Wood Powder", Published on Apr. 3, 2007.
English Abstract of KR100827320(B1), "Belt Rubber Composition for Tire", Published on May 7, 2008.
English Abstract of KR100879219(B1), "Fabrication of Polymer/Carbon Nanotubes Nanocomposite by Latex Aggregation", Published on Jan. 16, 2009.
English Translation of CN103923423A, "Rubber Compound Resistant to Fatigue and Aging", Published on Jul. 16, 2014.
Wang, "The termal resistance, flame retardance, and smoke control mechanism of nano MH/NBR composite material", Sci Eng Compos Mater 2014; 21(3): 309-314.
Botros et al., "Effect of fiber reinforcement on thermal stability and swelling behavior of CR/NBR blends", Polymer-Plastics Technology and Engineering, vol. 39(2), pp. 393-414, Jan. 2000.
English Abstract of CN101602867(A), "Modified chloroprene rubber V band and method for preparing same", published on Dec. 16, 2009.
English Abstract of CN103923423(A), "Rubber compound resistant to fatigue and aging", published on Jul. 16, 2014.
Ryu et al., "Effects of Fiber Aspect Ratio, Fiber Content, and Bonding Agent on Tensile and Tear Properties of Short-Fiber Reinforced Rubber", KSME International Journal, vol. 15(1), pp. 35-43, Dec. 2001.
Uchiyama et al., "Friction of Short-Fiber-Reinforced Rubber on Wet Surfaces", Journal of Applied Polymer Science, vol. 95, pp. 82-89, Apr. 2005.
Wada et al., "Friction and wear of short-fibre-reinforced rubber composites under various sliding speeds and loads", Wear, vol. 162-164, pp. 930-938, Jan. 1993.
Watson et al., "Elastomer reinforcement with short Kevlar aramid fiber for wear applications", Rubber World, vol. 198 (5), Aug. 2008.
English Abstract of CN102634092(A), "Fiber filled anti-ablation hydrogenated nitrile-butadiene rubber", published on Aug. 15, 2012.
English Abstract of CN1304473(C), "Natural liquid slurry with added carbon nanotube and its prepn process", published on Mar. 14, 2007.
English Abstract of CN101239801(A), "Preparation of carbon nano-tube/cement self-enhancing damping composite material damping ratio testing method", published on Aug. 13, 2008.

(56) References Cited

OTHER PUBLICATIONS

English Abstract of CN101418089(A), "Method for preparing natural rubber-carbon nano tube composite material by using static electricity self-assembly", published on Apr. 29, 2009.
English Abstract of CN102061015(A), "Heat conducting susceptibility latex product and preparation and method thereof", published on May 18, 2011.
English Abstract of CN102417610(A), "Graphene/carbon nanotube hybrid polymer composite material", published on Apr. 18, 2012.
English Abstract of EP2436720(A1), "Method for producing master batches containing nanoparticles", published on Apr. 4, 2012.
English Abstract of FR2945802(A1), "Carbon nanotube carpet", published on Nov. 16, 2010.
English Abstract of JP2004101958(A), "Conductive Member and Manufacturing Method Therefor", published on Apr. 2, 2004.
English Abstract of JP2004210830(A), "Elastomer Composition and Method for Producing the Same", published on Jul. 29, 2004.

\* cited by examiner

2A
Composition A

2B
Composition B

2C
Composition 1

RUBBER COMPOSITIONS AND USES THEREOF

The present application is a 35 USC 371 national stage entry of PCT/CA2013/000754 filed on Aug. 30, 2013 and which claims priority on U.S. 61/695,585 filed on Aug. 31, 2012. These documents are hereby incorporated by reference in its their entirety.

The present disclosure relates to improvements in the field of chemistry applied to rubber compositions. For example, such rubber compositions can be useful for preparing rubber tracks.

Various types of vehicles are frequently used under difficult conditions in which it is difficult for standard pneumatic tires to operate. Such vehicles can be, for example, tanks, armoured carriers, amphibious vehicles, agricultural equipments, tractors, construction equipments and excavators, forestry equipments, skid-steers, recreational vehicles, snowmobiles, all-terrain vehicles, etc. are sometime utilized on terrains which are very soft, for example sand, snow and/or mud surfaces. Generally, pneumatic tires are not suitable for operating on such soft surfaces, as they tend to burrow into the surface, rather than riding across the surface.

Endless track vehicles have been developed for use on terrains in which pneumatic tire equipped vehicles are impractical.

They are various types of endless tracks such as metallic tracks made of a plurality of metallic segments pivotally connected to each other and endless elastomeric tracks made from reinforced rubber and/or analogous elastomeric materials.

Several solution have been proposed so far for providing rubber compositions efficient for preparing rubber tracks that are light, durable and that can travels over paved surfaces without damaging them.

There is however still a need for providing an alternative to the existing solutions for preparing rubber compositions.

According to one aspect, there is provided a rubber composition comprising:
  an elastomer;
  reinforcing fibers and/or nanometric filamentary structures; and
  a filler.

According to another aspect, there is provided a rubber composition comprising:
  an elastomer;
  reinforcing fibers and/or nanometric filamentary structures; and
  a filler,
  wherein the composition is an uncured rubber composition.

According to another aspect, there is provided a rubber composition comprising:
  about 45 to about 70 wt. % of an elastomer;
  about 0.1 to about 10 wt. % of reinforcing fibers and/or nanometric filamentary structures; and
  about 15 to about 40 wt. % of a filler.

According to another aspect, there is provided a rubber composition comprising:
  about 45 to about 70 wt. % of an elastomer;
  about 0.1 to about 10 wt. % of reinforcing fibers and/or nanometric filamentary structures; and
  about 15 to about 40 wt. % of a filler.
  wherein the composition is an uncured rubber composition.

According to another aspect, there is provided a rubber composition comprising:
  an elastomer comprising a rubber chosen from natural rubber, styrene-butadiene rubber, polybutadiene rubber, nitrile-butadiene rubber, polychloroprene rubber, chlorosulphonated polyethylene rubber, ethylene propylene diene rubber and mixtures thereof;
  reinforcing fibers chosen from aramid fibers, carbon fibers, polyester fibers, glass fibers, nylon fibers and mixtures thereof, and/or nanometric filamentary structures chosen from nanowires, nanorods, nanofibers, nanoribbons, nanotubes and mixtures thereof, the nanometric filamentary structures being functionalized or unfunctionalized; and
  a filler chosen from carbon black and silica.

It was found that such compositions were effective for preparing various articles at low costs. In fact, these compositions allowed for preparing articles having the desired properties for various uses, while allowing for simple preparation processes at low costs. Moreover, these compositions were found to effective for preparing rubber articles showing improved and superior characteristics over articles made by prior art compositions.

Figure 2:
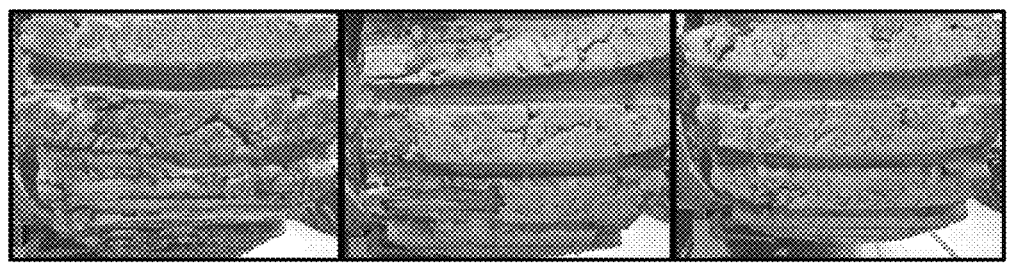

In the following drawings, which represent by way of examples only, various embodiments of the disclosure:

FIG. 1 is a plot showing modulus as a function of the elongation % of different examples of rubber compositions; and FIG. 2 shows pictures of three different examples (A, B and C) of rubber tracks that have each been made by different examples of rubber compositions.

Further features and advantages will become more readily apparent from the following description of various embodiments as illustrated by way of examples.

The expression "nanometric filamentary structures" as used herein refers to structures having a high dipole moment when they are charged since such nanometric structures have a high aspect ratio (length/diameter), which can be, for example, above 10. For example, they have a diameter that is inferior to about 100 nm, which allows a significant increase in the local electric field at the tip or the surface of the structures, so that they can readily emit electrons by the field or Schottky emission effect.

In understanding the scope of the present disclosure, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. The term "consisting" and its derivatives, as used herein, are intended to be closed terms that specify the presence of the stated features, elements, components, groups, integers, and/or steps, but exclude the presence of other unstated features, elements, components, groups, integers and/or steps. The term "consisting essentially of", as used herein, is intended to specify the presence of the stated features, elements, components, groups, integers, and/or steps as well as those that do not materially affect the basic and novel characteristic(s) of features, elements, components, groups, integers, and/or steps.

Terms of degree such as "about" and "approximately" as used herein mean a reasonable amount of deviation of the modified term such that the end result is not significantly changed. These terms of degree should be construed as including a deviation of at least ±5% or at least ±10% of the modified term if this deviation would not negate the meaning of the word it modifies.

The term "wt %" as used herein when describing an ingredient present in a composition, refers to the weight % of this ingredient based on the total weight of the composition.

For example, in the composition, the elastomer, reinforcing fibers and/or nanometric filamentary structures and filler can be substantially uniformly distributed.

For example, the elastomer can comprise a rubber chosen from natural rubber, styrene-butadiene rubber, polybutadiene rubber, nitrile-butadiene rubber (NBR), polychloroprene rubber, chlorosulphonated polyethylene rubber, ethylene propylene diene rubber and mixtures thereof.

For example, the reinforcing fibers can be chosen from aramid fibers, carbon fibers, polyester fibers, glass fibers, nylon fibers and mixtures thereof, and/or nanometric filamentary structures chosen from nanowires, nanorods, nanofibers, nanoribbons, nanotubes and mixtures thereof.

For example, the nanometric filamentary structures can be functionalized or unfunctionalized.

For example, the filler can be chosen from carbon black and silica.

For example, the composition can comprise about 45 to about 70 wt. %, about 50 to about 65 wt. % of the elastomer, about 55 to about 60 wt. % of the elastomer, or about 52 to about 61 wt. % of the elastomer.

For example, the composition can comprise about 40 to about 60 wt. % of the elastomer, about 40 to about 55 wt. % of the elastomer, or about 42 to about 48 wt. % of the elastomer.

For example, the composition can comprise about 0.1 to about 3 wt. %, about 0.25 to about 1.75 wt, about 0.5 to about 1.5 wt. %, or about 0.75 to about 1.25 wt. % of the reinforcing fibers.

For example, the composition can comprise about 0.1 to about 3 wt. %, about 0.25 to about 1.75 wt. %, about 0.5 to about 1.5 wt. % or about 0.75 to about 1.25 wt. % of the nanometric filamentary structures.

For example, the composition can comprise about 0.1 to about 10 wt. % of the reinforcing fibers and/or nanometric filamentary structures.

For example, the composition can comprise about 0.5 to about 10 wt. % of the reinforcing fibers and/or nanometric filamentary structures.

For example, the composition can comprise about 1 to about 5 wt. % of the reinforcing fibers and/or nanometric filamentary structures.

For example, the composition can comprise about 1 to about 3 wt. % of the reinforcing fibers and/or nanometric filamentary structures.

For example, the nanometric filamentary structures can comprise nanowires, nanorods, nanofibers, nanoribbons, nanotubes or bundles thereof, or mixtures thereof.

For example, the nanometric filamentary structures can comprise functionalized nanowires, functionalized nanorods, functionalized nanofibers, functionalized nanoribbons, functionalized nanotubes or bundles thereof, or mixtures thereof.

For example, the nanometric filamentary structures can be chosen from single-wall carbon nanotubes, functionalized single-wall carbon nanotubes, multi-wall carbon nanotubes, functionalized multi-wall carbon nanotubes, carbon nanometric fibres, functionalized carbon nanometric fibres and mixtures thereof.

For example, the nanometric filamentary structures can comprise a member chosen from of C, BN, B, Si, Ge, Bi, Sn, Te, Se, Hg, $Si_3N_4$, $V_2O_3$, $MX_2$ wherein M is Ti, Zr, Hf, Nb, Ta, Mo, W or Re and X is S, Se or Te, InP, InAs, GaN, GaP, GaAs, $Ga_2O_3$, ZnO, $In_2O_3$, $Na_2V_3O_7$, $Al_2O_3$, $B_2O_3$, MgO, CdO, $SiO_2$, $SnO_2$, CuO, $(SN)_x$, $Cu_2S$, $B_xC_yN_z$, $NiCl_2$, InS, ZnS, ZnSe, CdS, CdSe, $Ag_2Se$, SiC, $B_4C$, $M_2MoX_6$ wherein M is Li or Na and X is Se or Te, coated structures thereof and mixtures thereof.

For example, the aramid fibers can be short or long. For example, the aramid fibers can be in pulp or milled for.

For example the aramid fibers can be Twaron™ or Kevlar™.

For example, the rubber compositions of the disclosure can be used in the manufacture of various rubber articles including tracks, pneumatics, strips, sheets, bands, belts, hoses, linings, gaskets, guides, drive lugs, guide lugs, transmission belts, conveyor belts etc.

For example, the composition can comprise about 15 to about 40 wt. %, about 20 to about 35 wt. %, about 25 to about 32 wt % or about 26 to about 30 wt. % of the filler.

For example, the elastomer can comprise a rubber chosen from natural rubber, styrene-butadiene rubber, polybutadiene rubber or mixtures thereof.

For example, the elastomer can comprise a rubber chosen from styrene-butadiene rubber, polybutadiene rubber or a mixture thereof.

For example, the elastomer can comprise a rubber chosen natural rubber.

For example, the elastomer can comprise natural rubber and polybutadiene rubber.

For example, the elastomer can comprise styrene-butadiene rubber and polybutadiene rubber.

For example, the elastomer can comprise natural rubber, styrene-butadiene rubber and polybutadiene rubber.

For example, the elastomer can comprise nitrile-butadiene rubber.

For example, the elastomer can comprise polychloroprene rubber.

For example, the elastomer can comprise ethylene propylene diene rubber.

For example, the elastomer can comprise ethylene propylene diene rubber and styrene-butadiene rubber.

For example, the nitrile-butadiene rubber can comprise about 15 to about 65 wt. % of acrylonitrile, about 19 to about 51 wt. % of acrylonitrile, about 25 to about 50 wt. % of acrylonitrile or about 30 to about 45 wt. % of acrylonitrile.

For example, the composition can comprise reinforcing fibers that are aramid fibers.

For example, the composition can comprises nanometric filamentary structures that are carbon nanotubes. The carbon nanotubes can be functionalized or not.

For example, the carbon nanotubes can be multi-wall carbon nanotubes.

For example, the carbon nanotubes can be single-wall carbon nanotubes.

For example, the composition can further comprise a cross-linking agent. For example, the cross-linking agent can comprise sulphur.

For example, the composition can further comprise a cross-linking agent chosen from sulphur, metal oxides and peroxides.

For example, the composition can comprise about 0.5 to about 3.0% or about 0.5 to about 2.0% of the cross-linking agent.

For example, the composition can further comprise a plastifier.

For example, the plastifier can comprise high aromatic oil, naphtenic oil, parrafinic oil, adipates, sebacates and mixtures thereof.

For example, the composition can comprise about 1 to about 3% or about 1.5 to about 2.5% of the plastifier.

For example, the composition can comprise about 1 to about 20% or about 2 to about 15% of the plastifier.

For example, the composition can further comprise an anti-aging agent.

For example, the anti-aging agent can comprise 1,2-dihydro-2,2,4-trimethylquinoline, n-cyclohexyl-n'phenyl-p-phenylenediamine, zincmethylmercaptobenzimidazole, (ippd), wingstay 100, n.n'-bis-(I ethyl.3.methyl pentyl)-p-phenylffnedilsne, n-1,3-dimethylbutyl-n'-phenyl-p-phenylenediamine, octylated diphenylamine, n,n'-diphenyl-p-phenylenediamine, ble 75, or mixtures thereof.

For example, the composition can comprise about 1.0 to about 3.0%, or about 1.5 to about 2.5% of the anti-aging agent.

For example, the composition can further comprise a fluidizing agent.

For example, the fluidizing agent can comprise a hydrocarbon resin a phenolic resin, zinc soap salts, or mixtures thereof.

For example, the composition can comprise about 0.5 to about 3.0% or about 1.0 to about 2.5% of the fluidizing agent.

For example, the composition can further comprise a rubber vulcanization accelerator agent.

For example, the rubber vulcanization accelerator agent can be chosen from diphenylguanidine, (TBBS) N-tertiary butyl-2-benzothiazolesulfenamide, (TBSI) N-t-butyl-2-benzothiazolesulfenamide, benzothiazyl-2-dicyclohexyl sulfenamide, Delac MOR, (MBS: 2-(Morpholinothio)benzothiazole sulfenamide), Delac S (CBS N-Cyclohexyl-2-benzothiazolesulfenamide) DCBS (N,N-dicyclohexyl2-benzothiazolesulfenamide) MBT (2-mercaptobenzothiazole), MBTS (Dibenzothiazoledisulfide), DPG (Diphenylguanidine), ethylene thiourea, DTDM (4,4 dithiodimorpholine, TMTM (Tetramethylthiuram monosulfide), TMTD (Tetramethylthiuram disulfide), etc. and mixtures thereof.

For example, the composition can comprise about 0.5 to about 1.5% or about 0.75 to about 1.25% of the vulcanization accelerator agent.

For example, the composition can further comprise a retarding agent.

For example, the retarding agent can be chosen from (PVI) N-(cyclohexylthio)phthalimide, retarder SAX (salicylic acid), retarder ESEN, benzozoic acid, and mixtures thereof.

For example, the composition can comprise about 0.1 to about 1.0% or about 0.2 to about 0.8% of the retarding agent.

For example, the composition can further comprise a hardening agent.

For example, the hardening be an agent chosen from phenolic resin, hexamethylenetetramine, resimene (Hexamethoxymethyl/n-butyl-melamine formaldehyde resin), etc. and mixtures thereof.

For example, the composition can comprise about 0.5 to about 2.5% or about 1.0 to about 2.0% of the hardening agent.

For example, the composition can further comprise a reticulation agent.

For example, the reticulation agent can be chosen from stearic acid, zinc oxide and a mixture thereof.

For example, the composition can be an uncured rubber composition.

For example, the composition can be an uncured rubber composition having a Mooney viscosity $ML_{1+4}$ 145° C. of about 10 to about 120, measured according to D-1646 standard.

For example, the composition can be an uncured rubber composition having a Mooney viscosity $ML_{1+4}$ 145° C. of about 40 to about 100, measured according to D-1646 standard.

For example, the composition can be an uncured rubber composition having a Mooney viscosity $ML_{1+4}$ 145° C. of about 50 to about 100, measured according to D-1646 standard.

For example, the composition can be an uncured rubber composition having a Mooney viscosity $ML_{1+4}$ 145° C. of about 50 to about 80, measured according to D-1646 standard.

For example, the composition can be an uncured rubber composition having a Mooney viscosity $ML_{1+4}$ 145° C. of about 60 to about 80, measured according to D-1646 standard.

For example, the composition can be an uncured rubber composition having a Mooney Scorch time t5L 145° C. of about 3 to about 10 minutes, measured according to ASTM D-1646 standard.

For example, the composition can be an uncured rubber composition having a Mooney Scorch time t5L 145° C. of about 4 to about 8 minutes, measured according to ASTM D-1646 standard.

For example, the composition can be an uncured rubber composition having a Mooney Scorch time t5L 145° C. of about 4 to about 6 minutes, measured according to ASTM D-1646 standard.

For example, the composition can be an uncured rubber composition having a Mooney Scorch time t5L 145° C. of about 4 to about 5 minutes, measured according to ASTM D-1646 standard.

For example, the composition can be an uncured rubber composition having a specific gravity of about 1.0 to about 1.5 g/mL, measured according to ASTM D-297 standard.

For example, the composition can be an uncured rubber composition having a specific gravity of about 1.1 to about 1.2 g/mL, measured according to ASTM D-297 standard.

For example, the composition can be an uncured rubber composition having a specific gravity of about 1.10 to about 1.15 g/mL, measured according to ASTM D-297 standard.

For example, the composition can be a cured rubber composition.

For example, the composition can be a cured rubber composition having an elongation % of about 400 to about 650, measured according to ASTM D-412 standard.

For example, the composition can be a cured rubber composition having an elongation % of about 450 to about 600, measured according to ASTM D-412 standard.

For example, the composition can be a cured rubber composition having an elongation % of about 500 to about 575, measured according to ASTM D-412 standard.

For example, the composition can be a cured rubber composition having an elongation % of about 510 to about 560, measured according to ASTM D-412 standard.

For example, the composition can be a cured rubber composition having an elongation % of about 520 to about 550, measured according to ASTM D-412 standard.

For example, the composition can be a cured rubber composition having a 25% modulus of about 100 to about 500, measured according to ASTM D-412 standard.

For example, the composition can be a cured rubber composition having a 25% modulus of about 150 to about 450, measured according to ASTM D-412 standard.

For example, the composition can be a cured rubber composition having a 25% modulus of about 150 to about 300, measured according to ASTM D-412 standard.

For example, the composition can be a cured rubber composition having a 25% modulus of about 200 to about 300, measured according to ASTM D-412 standard.

For example, the composition can be a cured rubber composition having a 25% modulus of about 225 to about 275, measured according to ASTM D-412 standard.

For example, the composition can be a cured rubber composition having a cured rubber composition having a 100% modulus of about 300 to about 1000, measured according to ASTM D-412 standard.

For example, the composition can be a cured rubber composition having a cured rubber composition having a 100% modulus of about 400 to about 900, measured according to ASTM D-412 standard.

For example, the composition can be a cured rubber composition having a cured rubber composition having a 100% modulus of about 500 to about 900, measured according to ASTM D-412 standard.

For example, the composition can be a cured rubber composition having a cured rubber composition having a 100% modulus of about 700 to about 900, measured according to ASTM D-412 standard.

For example, the composition can be a cured rubber composition having a cured rubber composition having a 100% modulus of about 700 to about 850, measured according to ASTM D-412 standard.

For example, the composition can be a cured rubber composition having a cured rubber composition having a 300% modulus of about 1500 to about 3000, measured according to ASTM D-412 standard.

For example, the composition can be a cured rubber composition having a cured rubber composition having a 300% modulus of about 2000 to about 2800, measured according to ASTM D-412 standard.

For example, the composition can be a cured rubber composition having a cured rubber composition having a 300% modulus of about 2100 to about 2700, measured according to ASTM D-412 standard.

For example, the composition can be a cured rubber composition having a 300% modulus of about 2200 to about 2650, measured according to ASTM D-412 standard.

For example, the composition can be a cured rubber composition having a 300% modulus of about 2200 to about 2400, measured according to ASTM D-412 standard.

According to another aspect, there is provided a method of manufacturing a composition as defined in the present disclosure. The method comprises:

mixing together the elastomer and the reinforcing fibers and/or nanometric filamentary structures to obtain a first mixture;

mixing together the first mixture with the filler so as to obtain a second mixture; and mixing together the second mixture with a crosslinking agent.

According to another aspect, there is provided a method of manufacturing a composition as defined in the present disclosure. The method comprises:

mixing together the elastomer and the reinforcing fibers and/or nanometric filamentary structures to obtain a first mixture;

mixing together the first mixture with the filler and optionally an anti-aging agent so as to obtain a second mixture; and mixing together the second mixture with a crosslinking agent, optionally an hardening agent, and optionally a vulcanization accelerator agent.

According to another aspect, there is provided an article comprising a rubber composition as defined in the present disclosure.

According to another aspect, there is provided a method for manufacturing an article comprising rubber, the method comprising using a rubber composition as defined in the present disclosure when moulding, extruding and/or calendering the article.

For example, the method can comprise calendaring and/or extruding the rubber composition so as to obtain a rubber band, a rubber strip, a rubber log or a rubber sheet; and moulding and vulcanizing the a rubber band, a rubber strip, a rubber lug or a rubber sheet so as to obtain the article.

For example, the method can comprise calendaring and/or extruding the rubber composition so as to obtain is a rubber band, a rubber strip, a rubber log or a rubber sheet; and moulding and vulcanizing a plurality of rubber bands, rubber strips, rubber lugs or rubber sheets so as to obtain the article.

For example, the moulding can be carried out by compression moulding.

For example, the article can be a rubber band, a rubber strip or a rubber sheet.

For example, the article can be a track for use on a vehicle.

For example, the article can be a snowmobile track.

For example, the article can be a tractor track.

For example, the article can be a tank track.

For example, the track can be an endless track.

For example, the article can be a tire.

For example, the article can be a gasket.

For example, the article can be a hose.

For example, the article can be a transmission belt.

For example, the article can be a tank lining.

For example, the article can be a conveyor belt.

For example, the article can be a military pad.

For example, the article can be a military bushing.

For example, the article can be a rubber track.

For example, the article can be a tread.

For example, the article can be a drive lug.

For example, the article can be a guide lug.

For example, the article can be a mining mill lining.

For example, the article can be a ring for oil and gas drilling.

For example, the article can be a power section stator.

For example, the article can be a mining impact bar.

For example, the article can be a shock absorber.

For example, the article can be a truck box liner.

For example, the article can be a rubber band, a rubber strip, a rubber lug, a rubber belt or a rubber sheet.

For example, the article can be chosen from strips, sheets, bands, belts, hoses, linings, gaskets, guides, drive lugs, guide lugs, and transmission belts.

According to another aspect, there is provided a method for manufacturing an article comprising rubber, the method comprising using a rubber composition as defined in the present disclosure when moulding, extruding and/or calendering the article.

For example, the method can comprise calendaring and/or extruding the rubber composition so as to obtain a rubber band, a rubber strip, a rubber log or a rubber sheet; and moulding and vulcanizing the a rubber band, a rubber strip, a rubber lug or a rubber sheet so as to obtain the article.

For example, the method can comprise calendaring and/or extruding the rubber composition so as to obtain is a rubber band, a rubber strip, a rubber log or a rubber sheet; and moulding and vulcanizing a plurality of rubber bands, rubber strips, rubber lugs or rubber sheets so as to obtain the article.

For example, the moulding can be carried out by compression moulding.

The below presented examples are non-limitative and are used to better exemplify the processes of the present disclosure.

Example 1—Preparation of Rubber Composition 1

The ingredients use for the Composition 1 with their amount in phr-mass (g) per hundred grams of elastomer are represented in Table 1. The equivalents in 5 by weight is also presented. The Smoked Sheet Natural Rubber was produced by Tropicore™ inc. and is of purity grade RSS1. It is the main matrix elastomer. The Merge 1F722™ is a 23.5% w/w dispersion of short pulp aramid fibers in a natural rubber matrix processed in liquid phase by Dupont™ inc. It is a dispersion of aramid fiber. The NC 7000™ used is a high aspect ratio Multi Wall Carbon nanotube from Nanocyl™ sa with average wall diameter of 9.5 nm and with an average length of 1.5 microns. The carbon black grade used was produced from Continental™ inc. and corresponds to a N234 grade with an Iodine adsorption value of 120 mg/g and a DBP absorption value of 125 mL/100 g.

Stearic acid and zinc oxide are used to promote reticulation of rubber during curing as well as process aids. 1,2-dihydro-2,2,4-trimethylquinoline and 1,3-dimethylbutyl)-N'-phenyl-P-Phenylenediamine are used as anti-aging and anti-fatigue agents to capture free radicals. Parafin wax is used as a UV blocking agent. They were supplied by Ferguson Chemicals Inc.

N-tertiary butyl-2-benzothiazole sulfenimide was used as rubber vulcanization accelerator agent. Sulfur was used as e crosslinking agent. Phenolic resin was used as an hardening agent, cured itself by the presence of Hexamethylenetetramine. They were supplied by Ferguson™ Chemicals Inc.

TABLE 1

Formulation of Rubber Composition 1

| Material | phr | (wt. %) |
|---|---|---|
| First Stage Mix | | |
| R.S.S. # 1 (Smoked Sheet Natural Rubber) | 94.976 | 57.76 |
| MERGE 1F722 (KEVLAR Engeneered Elastomer) | 6.525 | 3.97 |
| NC 7000 (NC 7000 MWCNT) | 4.369 | 2.66 |
| Second Stage Mix | | |
| N-234 CONTI/VULCAN (N-234 Carbon Black) | 44.126 | 26.83 |
| EMERY-400/VSTEARIN (Stearic Acid) | 2.509 | 1.53 |
| ZINC OXYDE CR-4/ZOCO (Zinc Oxide) | 4.011 | 2.44 |
| T.M.Q./VULKANOX H (1,2-dihydro-2,2,4-trimethlyquinoline) | 1.003 | 0.61 |
| 6PPD/FLEXONE-7F N-(1,3-dimethylbutyl)-N'-phenyl-P-Phenylenediamine) | 2.006 | 1.22 |
| NOCHEK 4709A (Parafin Wax) | 1.506 | 0.92 |
| Third Stage Mix | | |
| TBSI (N-tertiary butyl-2-benzothiazole sulfenimide) | 1.103 | 0.67 |
| RHENOGRAN HEXA-80 (Hexamethylenetetramine) | 0.100 | 0.06 |

TABLE 1-continued

Formulation of Rubber Composition 1

| Material | phr | (wt. %) |
|---|---|---|
| SOUFRE H-10 (Sulfur) | 1.203 | 0.76 |
| S.P. 6700 (Phenolic Resin) | 1.003 | 0.61 |

Mixing and Processing Method

All the mixing phases and stages were carried in a Farrell 270 L Banbury mixer with Tangential rotors blending the ingredients by friction with the chamber sidewall and an hydraulic ram to put pressure to the mix. It is equipped with an automated control box permitting variable mixing speeds and an accurate control over time, pressure, energy and temperature during all the mixing process. The batch produced is then processed in a Twin Screw Sheeter extruder (TSS), put into strip form and then cooled down in a batchoff after each mix stage. If the mix is not final, it goes back to the mixer as a masterbatch for the next mixing step 24 hours later.

The first stage mix (preparation of MasterBatch 1) was carried out as follow:
1) Add NC 7000;
2) Add polymer and Merge 1F722;
3) Mix 5 seconds at 20 rpm (rotor revolutions per minute);
4) Mix Ram float at 20 rpm;
5) Mix until temperature rise to 120 Celcius at 50 rpm;
6) Ram up
7) Mix until temperature rise to 155 Celcius at 35 rpm;
8) Ram Up; and
9) Drop 3 minutes mixing time total, thereby obtaining MasterBatch 1

The aim of this first pass mix was to break down the viscosity of the natural rubber as well as to force the preliminary dispersion of MWCNT and aramid fibers which is a challenge to achieve completely. It is done at high sheer with a medium drop temperature.

The second stage mix (preparation of MasterBatch 2) was done as follows:
1) Add half carbon black;
2) Add MasterBatch 1 and chemicals (EMERY-400/VSTEARIN (Stearic Acid); ZINC OXYDE CR-4/ZOCO (Zinc Oxide); T.M.Q./VULKANOX H (1,2-dihydro-2,2,4-trimethylquinoline); 6PPD/FLEXONE-7FN-(1,3-dimethyl-butyl)-N'-phenyl-P-Phenylenediamine) and NOCHEK 4709A (Parafin Wax)
3) Mix to 105 Celcius at 50 rpm;
4) Add rest of carbon black;
5) Mix to 130 Celcius at 25 rpm;
6) Ram up;
7) Mix to 170 Celcius at 20 rpm; and
8) Drop 6 minutes mixing time total, MasterBatch 2.

The aim of this second pass is to force by high sheer the incorporation of the reinforcing carbon black and to complete the dispersion of aramid fibers, MWCNT and the other chemicals.

The third stage, the finalization of mixing, was perform accordingly to the following:
1) Add MasterBatch 2 and curative chemicals (TBSI(N-tertiary butyl-2-benzothiazole sulfenimide)RHENOGRAN HEXA-80 (Hexamethylenetetramine); SOUFRE H-10 (Sulfur); S.P. 6700 (Phenolic Resin);
2) Mix ram down 55 sec at 15 rpm;
3) Ram up;
4) Mix ram down 55 sec at 15 rpm;

5) Mix to 110 Celcius at 15 rpm; and
6) Drop;
2 minutes mixing time total, thereby obtaining composition 1 (uncured).

The mixing of the finalization is done at low sheer and low temperature. It is meant to be done to finalize the dispersion of the curative agents without beginning the cure and to avoid scorching of the product.

Example 2—Use of Rubber Composition 1 for Preparing Articles

The resulting uncured rubber Composition 1 can then be transformed in sheet form, profiles or lugs using a—two, three or four roll—calendar or an extruder equipped with a perform die, a roller head or without. The preformed material—for example a calendered uncured rubber sheet rolled of 15"×0.120"—may then be used downstream in the production process to be assembled uncured with other layers of itself, layers of other rubber compounds with different properties (hardness) and along with other reinforcing non rubber material, using the natural tack of the rubber. It is then cured in a final product by compression moulding. This operation consists of heating the rubber under a certain temperature (about 140° C. to about 180° C.) to make the sulphur creates crosslinks between polymer chains—the curing process that gives to the rubber its final stable elastic properties—at high pressure to remove gas in a product form directed by the moulds form. For example, these products can be used to in the manufacture of rubber tracks and rubber coated (plastic and metal) wheels for military, industrial, recreational and agricultural applications, but it may also be used to manufacture rubber pieces for the mining industry, tank lining, tires (of all kind and sizes), hoses, gaskets and all other rubber goods. The compression moulding equipment mastered are the circular hydraulic press—in which the whole track is cured in one step- and the indexation press (flat) in which the track is cured in two or three sequential steps. The rubber coated wheels are cured in a regular hydraulic press. Other equipments may be used to cure rubber, namely an injection press, the transfer press and the autoclave press.

These compositions can thus be used, for example, in track systems and in rubber coated wheels systems. The track tread is the exterior part, in contact with the field and responsible of the traction; the belt, which maintain the pressure around the sprockets and idlers may be very flexible around the sprockets but also very rigid in the rolling axis; the drive and guide lugs interior of the track, that must be rigid to act well but that must be also resistant and the wheels; which the rubber must resist wear and chucking. The durability of these products are very dependant of the weight of vehicle, heat generated, aging, degradation, chucking, wear etc. The technology claimed improves drastically all of them and moreover the final field performance. It is likely to do the same for all highly demanding dynamic applications like OTR tires, mining ball mills and conveyors, specialty hoses, etc.

Example 3—Preparation of Various Rubber Compositions

Similarly to Composition 1, previously discussed, other compositions (Compositions 2 to 5) have been prepared by using the same method. Their ingredients are listed in tables 2A and 2B below.

TABLE 2A

Ingredients of Various Rubber Compositions

| Trade Name | Chemical Formula | Composition-1 (NR 100, CNT, kevlar) % in compound P/P | Composition-2 (NR 100, CNT, Carbon Fiber) % in compound P/P | Composition-3 (NR 70 BR 30, CNT, Kevlar) phr | Composition-3 (NR 70 BR 30, CNT, Kevlar) compound P/P | Composition-4 (SBR/NR/BR, CNT, Kevlar) % in compound P/P | Composition-5 (SBR/BR, CNT) % in compound P/P |
|---|---|---|---|---|---|---|---|
| R.S.S. #1 (Smoked Sheet Natural Rubber) | cis-1,4 Polyisoprene | 57.76% | 59.98% | 64.975 | 35.92% | 19.41% | |
| SBR 1502 | Styrene-Butadiene-Polymer | | | | | 29.95% | 24.08% |
| SKD/ND BR-1220 | Polybutadiene Rubber | | | 30.004 | 16.59% | 5.99% | 30.09% |
| SBR 1904 | High Styrene Resin | | | | | | 6.02% |
| MERGE 1F722 | KEVLAR Engeneered Elastomer (in Natural Rubber) | 3.97% | | 6.520 | 3.60% | 3.91% | |
| PRO 7000 | NC 7000 MWCNT | 2.66% | 2.55% | 4.271 | 2.36% | 2.40% | 2.41% |
| Mil. Carbon Fiber 2/300 mic | Carbon Fiber | | 1.80% | | | | |
| Carbon Black N-115 | Carbon Black | | | | | 26.96% | |
| Carbon Black N-234 | Carbon Black | 26.83% | 27.03% | 55.000 | 30.41% | | 30.09% |
| Raffex 90 | High Aromatic Oil | | | 4.082 | 2.26% | | |
| Stearic Acid | Stearic acid | 1.53% | 1.50% | 2.500 | 1.38% | 0.90% | 0.30% |
| Zinc Oxide | Zinc Oxide | 2.44% | 2.40% | 4.000 | 2.21% | 2.40% | 1.81% |
| TMQ | 1,2-Dihydro-2,2,4-trimethylquinoline | 0.61% | 0.60% | 2.003 | 1.11% | 0.60% | 0.60% |
| 6PPD | N-cyclohexyl-N'-phenyl-p-phenylenediamine | 1.22% | 1.20% | 3.000 | 1.66% | 1.20% | 0.75% |
| Vanox ZMTI | Zincmethyl-mercaptobenzimidazole | | | | | 0.60% | 0.60% |
| NOCHEK 4709A, Blended Waxes | Paraffin Wax | 0.92% | 0.90% | 1.500 | 0.83% | 0.90% | |

TABLE 2A-continued

Ingredients of Various Rubber Compositions

| Trade Name | Chemical Formula | Composition-1 (NR 100, CNT, kevlar) % in compound P/P | Composition-2 (NR 100, CNT, Carbon Fiber) % in compound P/P | Composition-3 (NR 70 BR 30, CNT, Kevlar) phr | Composition-3 (NR 70 BR 30, CNT, Kevlar) compound P/P | Composition-4 (SBR/NR/BR, CNT, Kevlar) % in compound P/P | Composition-5 (SBR/BR, CNT) % in compound P/P |
|---|---|---|---|---|---|---|---|
| Struktol 40 MS | Mixture of dark Hydrocarbon Resins | | | | | 2.40% | |
| Struktol HPS 11 | Mixture of dark Hydrocarbon Resins | | | | | | 1.20% |
| TMTM | Tetramethylthiuram Monosulfide | | | | | | |
| DPG | Diphenylguanidine | | | | | | 0.12% |
| TBBS | N-tertiary butyl-2-benzothiazole sulfenamide | | | | | 0.90% | |
| TBSI | N-t-butyl-2-benzothiazole sulfenimide | 0.67% | 0.66% | 1.504 | 0.83% | | |
| Vukacit DZ/EGC | benzothyazyl-2-dicyclohexyl sulfenamide | | | | | | 0.60% |
| PVI | N-(cyclo-hexylthio)phthalimide | | | 0.299 | 0.17% | | |
| RHENOGRAN HEXA-80 | Hexamethylenetetramine | 0.06% | 0.06% | | | | |
| Vul-Cup 40KE | a,a'-bis(tert-butylperoxy)-diisopropylbenzene | | | | | | |
| Sulphur | Sulphur | 0.73% | 0.72% | 1.205 | 0.67% | 1.50% | 1.32% |
| Cyrez 963 | Hexamethoxymethyl-melamine | | | | | | |
| SP-6700 | Phenolic Resin | 0.61% | 0.60% | | | | |
| Total | | 100.00% | 100.00% | 180.86 | 100.00% | 100.00% | 100.00% |

TABLE 2B

Ingredients of Various Rubber Compositions

| Trade Name | Chemical Formula | Composition-6 (NBR 100, CNT, kevlar) % in compound P/P | Composition-7 (CR 100, CNT, Kevlar) % in compound P/P | Composition-8 (EPDM, CNT, Kevlar) % in compound P/P | Composition-9 (NR/BR, CNT, Kevlar) % in compound P/P | Composition-10 (BR/NR, silica, CNT, Kevlar) % in compound P/P |
|---|---|---|---|---|---|---|
| SOG 10 (Natural Rubber) | cis-1,4 Polyisoprene | | | | 24.94% | 14.96% |
| SBR 1502 | Styrene-Butadiene-Polymer | | | 7.79% | | |
| SKD/ND BR-1220 | Polybutadiene Rubber | | | | 27.71% | 41.89% |
| Kosyn KNB-35LM | Acrylonitrile-Butadiene-Polymer (NBR) | 52.36% | | | | |
| Neoprene W | Polychloroprene Rubber (CR) | | 53.85% | | | |
| Keltan 5470Q | Ethylenepropylenediene Rubber (EPDM) | | | 37.44% | | |
| MERGE 1F722 | KEVLAR Engeneered Elastomer (in Natural Rubber) | | | | 3.59% | 3.89% |
| MERGE 1F723 | KEVLAR Engeneered Elastomer (in SBR) | | | 2.04% | | |
| MERGE 1F770 | KEVLAR Engeneered Elastomer (in NBR) | 2.36% | | | | |
| Neoprene WRT Merge 1F819 | KEVLAR Engeneered Elastomer (in CR) | | 2.42% | | | |
| PRO 7000 | NC 7000 MWCNT | 1.08% | 1.11% | 0.94% | 2.47% | 1.20% |
| Carbon Black N-220 | Carbon Black | | 19.50% | | 30.48% | |
| Carbon Black N-550 | Carbon Black | 18.96% | | | | |

TABLE 2B-continued

Ingredients of Various Rubber Compositions

| Trade Name | Chemical Formula | Composition-6 (NBR 100, CNT, kevlar) % in compound P/P | Composition-7 (CR 100, CNT, Kevlar) % in compound P/P | Composition-8 (EPDM, CNT, Kevlar) % in compound P/P | Composition-9 (NR/BR, CNT, Kevlar) % in compound P/P | Composition-10 (BR/NR, silica, CNT, Kevlar) % in compound P/P |
|---|---|---|---|---|---|---|
| Carbon Black N-650 | Carbon Black | | | 28.08% | | |
| Carbon Black N-774 | Carbon Black | 5.42% | | | | |
| Ultrasil 7000 | Silica | | | | | 23.94% |
| Raffex 90 | High Aromatic Oil | | 8.36% | | 2.22% | |
| Hyprene L2000 | Naphtenic Oil | | | 14.04% | | |
| DBEEA | Dibutoxyethoxyethyl adipate plastisizer | 11.38% | | | | |
| Degussa Si-69 | Bis (triethoxysilylpropyl) polysulfide | | | | | 2.45% |
| PAB 1631 | Red Lead | | 11.14% | | | |
| SR-350 | Trimethylolpropane Trimethacrylate | | | 0.70% | | |
| Stearic Acid | Stearic acid | 0.54% | 0.28% | | 1.39% | |
| Zinc Oxide | Zinc Oxide | 2.71% | | | 2.22% | 0.90% |
| TMQ | 1,2-Dihydro-2,2,4-trimethylquinoline | | | 0.47% | 1.11% | |
| 6PPD | N-cyclohexyl-N'-phenyl-p-phenylenediamine | 1.35% | | | 1.66% | |
| Octamine | Octylated Diphenylamine | | 1.11% | | | 0.60% |
| NOCHEK 4709A, Blended Waxes | Paraffin Wax | 1.63% | | | 0.83% | |
| Poly AC 617 | Low Density Polyethylene | | 1.11% | | | |
| Penacolite B19S | Resorcinol-formaldehyde-resorcinol polymer resin | | | 1.17% | | |
| Wingtack 95 | Aliphatic C-5 Petroleum Hydrocarbon Resin | | | 2.34% | | |
| Nevchem 100 | Alkylated aromatic hydrocarbon Resin | | | | | 7.78% |
| TMTM | Tetramethylthiuram Monosulfide | | 0.56% | | | |
| MBS | 2-(morpholinothio) benzothiazole sufenamide | | | | 0.55% | |
| TBBS | N-tertiary butyl-2-benzothiazole sulfenamide | 1.08% | | | | 1.20% |
| PVI | N-(cyclo-hexylthio)phthalimide | | | | 0.17% | |
| Vul-Cup 40KE | a,a'-bis(tert-butylperoxy)-diisopropylbenzene | | | 3.74% | | |
| Sulphur | Sulphur | 1.14% | 0.56% | 0.09% | 0.67% | 1.20% |
| Cyrez 963 | Hexamethoxymethyl-melamine | | | 1.17% | | |
| Total | | 100.00% | 100.00% | 100.00% | 100.00% | 100.00% |

Example 4—Comparative Tests for Various Rubber Compositions

Compositions 2 to 10 have been cured as described for Composition 1 in Example 2. The physical properties of Compositions 1 to 10 as well as two reference compositions used by the Applicants are listed in Table 3. Moreover, some results of traction tests made are shown in FIG. 1 (compound stress-strain curve).

TABLE 3

Physical Properties of Various Rubber Compositions

| | Tested Compositions | | | | | |
|---|---|---|---|---|---|---|
| Tests | Composition A | Composition B | Composition-1 | Composition-2 | Composition-3 | Composition-4 |
| Specific Gravity (g/mL) | 1.138 | 1.134 | 1.11 | 1.112 | 1.13 | 1.124 |
| Hardness (shore A) | 65 | 67 | 75 | 75 | 79 | 74 |
| Tensile (psi) | 3565 | 4513 | 4090 | 4196 | 3496 | 3049 |
| Elongation (%) | 559 | 545 | 535 | 510 | 409 | 390 |
| Modulus 25% | 148 | 152 | 254 | 253 | 472 | 242 |
| Modulus 100% | 344 | 389 | 716 | 679 | 880 | 825 |

TABLE 3-continued

Physical Properties of Various Rubber Compositions

| | | | | | | |
|---|---|---|---|---|---|---|
| Modulus 300% | 1622 | 2284 | 2216 | 2305 | 2634 | 2229 |
| Tear (lbs, die C) | 465 | 683 | 661 | 825 | 630 | 269 |
| MDR 191C ML | 2.64 | 3.18 | 4.90 | 3.61 | 4.17 | 2.9 |
| MDR 191C t10 | 0.47 | 0.34 | 0.36 | 0.34 | 0.44 | 0.64 |
| MDR 191C t90 | 1.47 | 0.88 | 0.97 | 1.00 | 1.33 | 1.54 |
| MDR 191C MH | 12.52 | 13.63 | 17.03 | 14.13 | 17.13 | 20.24 |
| Viscosity ML 145C | 66 | 71 | 98 | 95 | 80 | 52 |
| Scorch T-5 145C | 6.77 | 5.61 | 4.52 | 5.73 | 9.24 | 7.23 |
| Cut&Chip (cm3) | 0.85 | 1.14 | 0.91 | 0.95 | NA | 1.23 |
| DIN Abrasion (mm3) | 95 | 95 | 111 | 116 | NA | 114 |
| Flexometre (Delta T) | 42 | 52 | 56 | 67 | NA | 72 |
| Crack Growth (% at 1000k cycles) | 350 | 200 | 530 | 0.42 | NA | 820 |
| Compression Modulus (psi, 20% deflection) | 189 | 182 | 232 | 243 | NA | 236 |

| | Tested Compositions | | | | | |
|---|---|---|---|---|---|---|
| Tests | Composition-5 | Composition-6 | Composition-7 | Composition-8 | Composition-9 | Composition-10 |
| Specific Gravity (g/mL) | 1.139 | 1.164 | 1.403 | 1.087 | 1.134 | 1.108 |
| Hardness (shore A) | 77 | 66 | 65 | 75 | 74 | 64 |
| Tensile (psi) | 2928 | 1863 | 2885 | 1946 | 3191 | 1993 |
| Elongation (%) | 340 | 302 | 512 | 243 | 456 | 463 |
| Modulus 25% | 284 | 496 | NA | NA | 274 | 150 |
| Modulus 100% | 807 | 823 | 740 | 892 | 782 | 399 |
| Modulus 300% | 2633 | 1849 | 1754 | — | 2140 | 1142 |
| Tear (lbs, die C) | 278 | 200 | 301 | 207 | 580 | 274 |
| MDR 191C ML | 5.92 | 0.65 | 1.55 | 1.71 | 4.08 | 2.19 |
| MDR 191C t10 | 0.53 | 0.71 | 0.54 | 0.34 | 0.6 | 0.58 |
| MDR 191C t90 | 2.47 | 1.86 | 3.24 | 2.11 | 1.72 | 1.17 |
| MDR 191C MH | 22.92 | 14.72 | 13.42 | 21.52 | 15.69 | 14.13 |
| Viscosity ML 145C | 101 | 18 | 41 | 46 | 71 | 27 |
| Scorch T-5 145C | 7.48 | 6.75 | 3.25 | 3.55 | 11.12 | 11.03 |
| Cut&Chip (cm3) | 0.51 | NA | NA | NA | 0.78 | NA |
| DIN Abrasion (mm3) | 66 | 114 | 100 | 133 | 69 | 62 |
| Flexometre (Delta T) | 72 | NA | NA | NA | 85 | NA |
| Crack Growth (% at 1000k cycles) | NA | NA | NA | NA | 0.795 | NA |
| Compression Modulus (psi, 20% deflection) | 386 | NA | NA | NA | 257 | NA |

Specific Gravity has been measured according to ASTM D-297 standard. Hardness has been measured according to ASTM D-2240 standard with a Bareiss Durometer. Tensile strength, elongation at break and modulus has been measured according to ASTM D-412 standard with a TensiData tensiometer. Tear propagation strength was measured according to ASTM standard D-624 die C with a TensiData tensiometer.

MDR and viscosimetry have been tested using standards ASTM D-2084 and D-1646 respectively. The aim of these tests are to understand the processing behaviour of the uncured rubber paste to optimise calendaring and extrusion as well as to understand and control the curing kinetics (slow curing or fast curing) during mould vulcanization.

Cut&Chip test was done according to BFG method. The aim of this test was to measure mass loss of rubber under the repeated application of a knife to chunk the material. DIN abrasion test has been evaluated with a Bareiss DIN abrader instrument according to ASTM D-5963 method and was meant to measure the resistance of the material to wear. Hysteretic properties—increase of temperature—of the rubber were measured using a BFG Flexometer according to standard ASTM D-623. Crack propagation resistance has been measured with a Ross flex instrument with crack lengths measured every 24 hours over a period of 1 week (total 1M cycles, 144 k cycles per day). Compression modulus has been measured with a compression cell attached to a TensiData tensiometer. The quality of the dispersion will be measured by TEM analysis. Thermal conductivity measurements are also to be addressed as MWCNT have intrinsically the property to be conductive.

Field Tests Results

Tank tracks have been made with the cured rubber compositions presented in Examples 3 and 4. The 32 tons military tank track exterior tread durability after 2919 km off-road application are shown in FIG. 2 for Composition 1 (see FIG. 2 C) compared to two durable internal standards (Composition A (FIG. 2 A) and Composition B (FIG. 2 B)). The results are presented in Table 4 below. Composition A comprises an elastomer blend comprising natural rubber and polybutadiene 65 duro shore A hardness and Composition B comprises natural rubber 70 duro shore A hardness as elastomer. Compositions A and B also comprise several ingredients that are similar to the ingredients of Compositions 1 to 10. However, Compositions A and B do not comprise reinforcing fibers as described in the present disclosure. The rating was made according to an internal standard developed by Soucy International Inc.

TABLE 4

Comparative Testing for various Compositions

| Composition | Rating (%) | Remarks |
|---|---|---|
| Composition A | 77 | Failed early during the field test |
| Composition B | 100 | Few cracks but deep; delamination of the tread pitches: 3 on 6 at the base; At the |

TABLE 4-continued

Comparative Testing for various Compositions

| Composition | Rating (%) | Remarks |
|---|---|---|
| Composition 1 | 140 | beggining, the durability is average, but shows good aging properties after Few cracks but not much deep; Few delamination at the tread base. |

Composition 1, was mixed as described to optimise the dispersion of MWCNT, carbon black and aramid fibers in the polymer matrix. For the carbon black and MWCNT dispersion, it has been demonstrated by TEM microscopy that MWCNT bundles are all disentangled and the CNTs alone are exfoliated uniformly and distributed randomly.

On rheology and viscosity results, it is clearly shown that Compositions 1 to 5 increase viscosity and curing kinetics (see Table 3). It is a clear sign of the improved reinforcement of the polymer matrix. The bonds created between MWCNT, Carbon black and aramid fibers are strong and the material is then more viscous. On the process aspect—preforming and moulding—it represents potentially a loss in workability as it is a harder material uncured with less fluidity. However, the viscosity values are still in a range that is very comfortable to handle with. The experimental military tank tracks have been cured in an indexation mold at 140° C. for 90 minutes without any reversion or degradation due to high temperature exposure on a long timeframe.

Composition 1 was then tested on a military tank in off-road applications and showed over 40% better durability than the first compound following (see FIG. 2 and Table 4). This may be explained by different aspects. It can be seen from Table 3 and FIG. 1 that Composition 1 moduli are clearly higher than the other compositions and especially in compression. Higher modulus makes the rubber much harder to move, flex and compress and to get cut by rocks. However, with regular technologies, the elongation and tear properties usually are lower for harder than softer compounds. The hard rubbers are then brittle and get damaged more easily. What was unexpected with Composition 1 is that the strength, elongation at break and tear are very high. These properties for tank track tread off the road applications were quite suitable. It is a hard composition, strong and flexible. Compositions 2 to 10 also demonstrated interesting properties.

Without being bound or limited by such a theory, Applicants believe that the increased hardness, strength and flexibility of Composition 1 can be due to a very strong interaction between MWCNT, carbon black and the natural rubber elastomeric matrix. MWCNT is by itself a very strong fiber. However, its chemical interaction with natural rubber (NR), styrene-butadiene rubber (SBR) and Polybutadiene rubber (SBR) is week and the reinforcement is then too low. Also, MWCNT bundles are very difficult to disperse properly in elastomeric matrix. It has been found that the incorporation of MWCNT with carbon black in rubber was very beneficial. There is a synergistic reinforcement with the presence of both of them. It is believed, without being bound or limited by such a theory, that the chemical bonds involved is a mix of Dipole-dipole and Van der Waals bonds favorized in the close presence of high aspect ratio MWCNT and carbon black at the surface of polymer chains. The mechanism is however unclear at the moment. Also, in Banbury mixing process, the presence of carbon black helps significantly the dispersion by breaking MWCNT bundles. The MWCNT is then moreover dispersed mechanically more efficiently and is more subject to interact in bigger amount with polymer chains and not to act like a cluster contaminant, which usually weakens the material. Also, Applicants have found evidences that the presence of MWCNT increase the thermal conductivity by in house lab tests on diffusivity of the material.

The presence of Kevlar pulp aramid fiber can improve the durability of the tread compound. As the MWCNT-Carbon black reinforcement of elastomer takes place at molecular and nanometric level, it is believed, without being bound or limited by such a theory, that aramid fibers complete the material reinforcement at the macroscopic level. It can act as a material puncturing prevention and that prevents cutting. Also, when a crack is still generated, aramid fibers can prevent its propagation by strong bridging both sides of the cracks path. It was observed that a short aramid pulp fiber was very strong and easy to disperse. The Merge 1F722 Dupont dispersion comprises aramid fibers incorporated in a natural rubber binding matrix by solution mixing.

It can thus be seen that the compositions of the present disclosure (Compositions 1 to 10) have significant advantages and superior properties when compared to standard compositions (Compositions A and B) that do not comprise reinforcing fibers. In fact, the tank track comprising Composition 1 (FIG. 2 C) was considerably more resistant than the tracks made with Compositions A and B (FIGS. 2 A and 2 B). It was observed that the track comprising Composition 1 (FIG. 2 C) had significantly less cracks and was considerably less damaged.

For all these reasons, it was found that the compositions of the present disclosure were very durable in the military rubber track tread applications. Such compositions can thus be useful for manufacturing various rubber products used in military, mining, oil and gas, agricultural, industrial and recreational applications.

While a description was made with particular reference to the specific embodiments, it will be understood that numerous modifications thereto will appear to those skilled in the art. Accordingly, the above description and accompanying drawings should be taken as specific examples and not in a limiting sense.

What is claimed is:

1. A rubber composition comprising:
    about 40 to about 70 wt. % of an elastomer comprising a rubber chosen from natural rubber, styrene-butadiene rubber, polybutadiene rubber, nitrile-butadiene rubber, polychloroprene rubber, chlorosulphonated polyethylene rubber and mixtures thereof; and
    an additive comprising:
        about 0.1 to about 5 wt. % of reinforcing fibers that are aramid fibers;
        about 1 to about 3 wt. % of nanometric filamentary structures that are carbon nanotubes, said nanometric filamentary structures being functionalized or unfunctionalized; and
        about 24 to about 40 wt. % of a filler that is carbon black,
    wherein said rubber composition is a cured rubber composition having an increased strength as measured by modulus 25% and no greater than about 1.83% 2% decrease in elongation compared to a reference cured rubber composition that consists of the same percentage by weight of said elastomer and the same the percentage by weight of said additive, but wherein said additive excludes said reinforcing fibers and said nanometric filamentary structures, and wherein said cured rubber composition has an elongation % of about 390 to about 650, measured according to ASTM D-412 standard; and a 25% modulus of about 150 psi to about 450 psi, measured according to ASTM D-412 standard.

2. The composition of claim 1, wherein said composition comprises nanometric filamentary structures that are unfunctionalized carbon nanotubes.

3. The composition of claim 2, wherein said carbon nanotubes are multi-wall carbon nanotubes.

4. The composition of claim 3, wherein said composition comprises about 1.75 to about 3 wt. % of said nanometric filamentary structures.

5. The composition of claim 3, wherein said composition comprises about 2 to about 3 wt. % of said nanometric filamentary structures.

6. The composition of claim 5, wherein said composition comprises about 1 to about 5 wt. % of said reinforcing fibers.

7. The composition of claim 6, wherein said elastomer comprises a rubber chosen from natural rubber, styrene-butadiene rubber, polybutadiene rubber and mixtures thereof.

8. The composition of claim 6, wherein said composition comprises about 45 to about 60 wt. % of said elastomer.

9. The composition of claim 3, wherein said composition comprises about 0.5 to about 5 wt. % of said reinforcing fibers.

10. The composition of claim 2, wherein said composition comprises about 1.5 to about 3 wt. % of said nanometric filamentary structures.

11. The composition of claim 2, wherein said composition comprises said reinforcing fibers and said nanometric filamentary structures, and wherein the combination of said reinforcing fibers and said nanometric filamentary structures represents about 1.1 to about 6 wt. %.

12. The composition of claim 1, wherein said composition comprises about 50 to about 65 wt. % of said elastomer.

13. The composition of claim 12, wherein said composition is an uncured rubber composition having a Mooney viscosity $ML_{1-4}$ 145° C. of about 40 to about 100, measured according to D-1646 standard.

14. The composition of claim 12, wherein said composition is a cured rubber composition.

15. The composition of claim 1, wherein said composition comprises about 25 to about 32 wt % of said filler.

16. The composition of claim 1, wherein said composition comprises about 26 to about 30 wt % of said filler.

17. The composition of claim 1, wherein the composition comprises about 0.1 to about 3 wt % of said reinforcing fibers.

18. A rubber composition comprising
about 40 to about 70 wt. % of an elastomer comprising a rubber chosen from natural rubber, styrene-butadiene rubber, polybutadiene rubber, nitrile-butadiene rubber, polychloroprene rubber, chlorosulphonated polyethylene rubber and mixtures thereof; and
an additive comprising:
about 0.1 to about 5 wt. % of reinforcing fibers that are aramid fibers;
about 1 to about 3 wt. % of nanometric filamentary structures that are carbon nanotubes, said nanometric filamentary structures being functionalized or unfunctionalized; and
about 24 to about 40 wt. % of a filler that is carbon black,
wherein said rubber composition is a cured rubber composition having an increased strength as measured by modulus 100% and no greater than about 1.83% decrease in elongation compared to a reference cured rubber composition that consists of the same percentage by weight of said elastomer and than said the same the percentage by weight of said additive, but wherein said additive excludes said reinforcing fibers and said nanometric filamentary structures;
and wherein said cured rubber composition has an elongation % of about 390 to about 650, measured according to ASTM D-412 standard; and a 100% modulus of about 300 psi to about 1000 psi, measured according to ASTM D-412 standard.

19. The composition of claim 18, wherein the composition comprises about 0.1 to about 3 wt % of said reinforcing fibers.

20. A method of manufacturing a composition as defined in claim 1 comprising:
mixing together said elastomer, said reinforcing fibers and said nanometric filamentary structures to obtain a first mixture;
mixing together said first mixture with said filler so as to obtain a second mixture; and
mixing together said second mixture with a crosslinking agent.

21. A method of manufacturing a composition as defined in claim 1 comprising:
mixing together said elastomer, said reinforcing fibers and said nanometric filamentary structures to obtain a first mixture;
mixing together said first mixture with said filler and optionally an anti-aging agent so as to obtain a second mixture; and
mixing together said second mixture with a crosslinking agent, optionally an hardening agent, and optionally a vulcanization accelerator agent.

22. An article comprising a rubber composition as defined in claim 1.

23. A method for manufacturing an article comprising rubber, said method comprising using a rubber composition as defined in claim 1 when moulding, extruding and/or calendering said article.

* * * * *